(12) United States Patent
Schmutz (10) Patent No.: US 6,262,981 B1
(45) Date of Patent: Jul. 17, 2001

(54) DYNAMIC OVERFLOW PROTECTION FOR FINITE DIGITAL WORD-LENGTH MULTI-CARRIER TRANSMITTER COMMUNICATIONS EQUIPMENT

(75) Inventor: Thomas R. Schmutz, Indiatlantic, FL (US)

(73) Assignee: Airnet Communications Corporation, Melbourne, FL (US)

( * ) Notice: Subject to any disclaimer, the term of this patent is extended or adjusted under 35 U.S.C. 154(b) by 0 days.

(21) Appl. No.: 09/549,812

(22) Filed: Apr. 14, 2000

Related U.S. Application Data
(60) Provisional application No. 60/129,320, filed on Apr. 14, 1999.

(51) Int. Cl.⁷ .................................................. H04B 7/212
(52) U.S. Cl. ........................ 370/347; 370/345; 370/310
(58) Field of Search ................................... 370/321, 337, 370/347, 252, 330, 310, 328, 329; 455/522, 69, 422; 320/318; 375/219, 232, 260

(56) References Cited

U.S. PATENT DOCUMENTS

| | | |
|---|---|---|
| 5,333,175 * | 7/1994 | Ariyavisitakul et al. .......... 455/69 X |
| 5,528,585 | 6/1996 | Cooley et al. . |
| 5,535,240 | 7/1996 | Carney et al. . |
| 5,537,435 | 7/1996 | Carney et al. . |
| 5,606,575 * | 2/1997 | Williams ............................ 375/219 |
| 5,848,097 * | 12/1998 | Carney ................................ 375/219 |
| 6,011,785 * | 1/2000 | Carney ................................ 370/330 |

* cited by examiner

Primary Examiner—Douglas Olms
Assistant Examiner—Ricardo M. Pizarro
(74) Attorney, Agent, or Firm—Akerman Senterfitt (57) ABSTRACT

A method and apparatus for power management that controls the overflow of a digital combiner used in the transmit path for a broadband transceiver station (BTS) is disclosed. Power is managed by a digital word banking agent which is a part of the BTS system software. If a new channel request is received, the digital word banking agent determines if the request can be satisfied at the requested power level. Otherwise, the digital word banking agent determines if the channel request can be satisfied at a lower power request. The digital word banking agent also manages active channels by reclaiming power from channels requiring less power and/or by allocating more power to the channels requesting more power. If the digital word banking agent cannot satisfy a request, the digital word banking agent will queue the request for submission at a later time in the event that additional power becomes available.

11 Claims, 8 Drawing Sheets

DYNAMIC OVERFLOW PROTECTION FOR FINITE DIGITAL WORD-LENGTH MULTI-CARRIER TRANSMITTER COMMUNICATIONS EQUIPMENT

CROSS REFERENCE TO RELATED APPLICATIONS

This application is related to and claims priority from U.S. Provisional Application 60/129,320 entitled "DYNAMIC OVERFLOW PROTECTION FOR FINITE DIGITAL WORD-LENGTH MULTI-CARRIER TRANSMITTER COMMUNICATIONS EQUIPMENT" filed Apr. 14, 1999, the entirety of which is incorporated herein by reference.

BACKGROUND OF THE INVENTION

1. Field of the Invention

This invention relates to a method for managing the size of a digital word representing a signal amplitude in any digital system having finite word length processing capacity that digitally combines more than one signal into a single composite signal. More specifically, the invention relates to a power management system in a base station transceiver system which uses a digital combiner in the transmit path to combine digital signals to control combiner overflow.

2. Description of the Relevant Art

A conventional cellular phone system includes a plurality of cells, mobile units, a plurality of base transceiver stations (BTS), communication lines, a mobile telecommunications switching office (MTSO), an interface and a switched telephone network. A fixed number of channel sets are distributed among each BTS which serves a plurality of cells, arranged in a predetermined reusable pattern. The mobile unit, in a cell, communicates with the BTS, via radio frequency (RF) means.

The BTS communicates with the MTSO via communication lines. The MTSO communicates with the switched telephone network via the interface. Each BTS relays telephone signals between mobile units and a mobile telecommunications switching office (MTSO) by way of the communication lines. The communication lines between a cell site and the MTSO, are typically T1 lines. The T1 lines carry separate voice grade circuits for each radio channel equipped at the cell site, and data circuits for switching and other control functions.

An advanced BTS architecture combines a digital approach to transceiver design with broadband radio technology. This architecture uses a single broadband radio and an FFT based channelizer to digitally extract all receive channels simultaneously. An analogous technique is used on the transmit side to combine multiple channels using an inverse FFT combiner for radio transmission. Processing one composite digital signal allows substantial efficiencies compared to narrowband base stations through the reduction of components. This architecture is described fully in U.S. Pat. Nos. 5,535,240 and 5,537,435, the contents of which are hereby incorporated by reference. In short, a receiver section receives a plurality of carrier frequency communication channels and outputs digital signals representative of the contents of the plurality of communication channels. Each carrier frequency typically contains a number of channels in accordance with a TDMA format or other suitable division format. The receiver section contains an FFT-based channelizer that processes the digital signals output by a wideband digital receiver and couples respective channel outputs to a first plurality of digital signal processor units. The digital signal processor units process (e.g. demodulate) respective ones of the digital channel signals and supply processed ones of the digital channel signals at respective output ports for distribution to an attendant voice/data network.

On the transmit side, a transmit section contains a plurality of digital signal processors, respectively corresponding to a plurality of incoming (voice/data) communication signals to be transmitted over respectively different frequency channels. The processed (modulated, encoded) outputs of the DSP units are supplied to an inverse FFT digital combiner. The inverse digital FFT combiner supplies a combined multichannel signal which is then D/A converted, amplified by a high power multi-carrier power amplifier (MCPA), then supplied to a wideband transmitter which transmits a single multiple frequency communication channel signal.

In order to remain competitive in an increasingly crowded market, wireless equipment manufacturers experience constant pressure to reduce their costs. One way to reduce the overall cost of a cellular phone system is to re-design individual system components or software to operate more efficiently. For example, time dependent multiple access or TDMA divides each carrier frequency into multiple time slots. For example, if eight time slots are used, eight separate calls can be placed on each carrier frequency, multiplying a system's capacity by a factor of eight. A TDMA scheme assigns a specific time slot for each call's use during a conversation. Code division multiple access or CDMA is another transmission technology. Rather than separating frequencies by time as in TDMA, CDMA separates calls by code. In CDMA, every bit of every conversation gets tagged with a separate code.

Increased cellular system efficiency can also be realized through the use of power management techniques. A practical cellular system has limited power capabilities. It would be economically desirable to accommodate more system users while maintaining a reasonable power level per user. Such efficiencies can theoretically be realized because of the less than maximum power normally allocated to traffic channels and the random phase relationship of various channels. However, in a system that uses a digital combiner in the transmit path, such a method presents difficulties associated with possible combiner overflow. Failure to address this issue can result in compromised transmitted signal quality.

Digital combiners have a finite bit processing capability. In a TDMA system, combiners process bits on a time slot by time slot basis, combining the bit streams of all active channels sharing the same time slot. This bit processing capability is exceeded when the sum total of the digital inputs in a given time slot result in a composite output that exceeds a pre-determined combiner limit, at which point combiner overflow will occur. Digital overflow is undesirable because it can destroy the transmission signal to noise ratio, distort the transmitted signals and even possibly disable the entire BTS. One approach for controlling overflow of the digital combiner is by digitally reducing the digital representation of the input carrier amplitude input to the combiner. For example, overflow can be avoided entirely if the digital representation of carrier power levels are limited so that overflow cannot theoretically occur. This would correspond to power limitations based on a worst case calculation that assumes all active carriers are at full power and are perfectly phased.

Simply limiting the digital amplitude of all carriers input into the combiner will not provide a satisfactory solution to the foregoing combiner overflow problem since the resultant combiner digital output will often be significantly less than required to drive digital to analog conversion circuitry to full scale. Assuming the MCPA has sufficient gain, it could theoretically provide the power desired by the cellular user even if digital representations of carrier power levels output from the combiner are limited to prevent overflow. However, power amplifiers always have limited gain and are often designed to operate most efficiently near their limit for economic reasons. Second, even assuming the power amplifier can supply sufficient power to provide the mobile user with the desired power level, a reduction in digital signal amplitude output from the combiner will result in degraded signal quality because the carrier to noise level will be fixed at the output of the Analog to Digital (D/A) converter. The noise floor of the D/A is fixed and C/I is maximized by maximizing the carrier digital level into the D/A. The additional power provided by the amplifier will amplify the signal and the noise equally, maintaining the non-optimal C/I result from the D/A. Therefore, additional amplifier gain would not achieve the same benefit that maximizing the input digital word to the combiner would achieve.

Fortunately, a theoretical worst case power configuration is unlikely to occur. Some carriers may not be active. In addition, most carriers will not be at maximum power because in an actual deployment it is not expected that all carriers will be operating at or near full power. Full power for all carriers would be a statistically infrequent event because it is expected that BTS users will be randomly scattered in a standard cell and will require a different downlink power amounts. Since it is not expected that all carriers will require maximum power simultaneously, a smaller number of carriers can use relatively larger amounts of power than would be possible if all carriers were transmitting maximum power.

Finally, while it is possible that in the random course of events all carriers could be in phase with one another, this would be statistically infrequent event. Even if most carriers find themselves phased at a given instant during a given TDMA time slot, the magnitude of the buildup will be dissipated during the next burst because the carrier phase relationships will have randomly changed.

Therefore, there is a need for maximizing available carrier power and at the same time limiting actual digital overflows of the combiner. A dynamic digital overflow management system will enable more efficient usage of system power allowing a greater number of users and more power per user without risking substantial combiner overflows which can adversely affect service.

SUMMARY OF THE INVENTION

The invention concerns method for controlling the size of a composite digital word processed by a digital combiner which combines the signals of more than one TDMA RF channel into a single composite multichannel digital output signal in a broadband transceiver used for cellular communication. A request is initially received from a channel with a requested power value. The requested power is converted to a requested digital word value and added to the digital word values for other active channels in the requesting channel's time slot and compared to a fixed value related to the largest composite digital word that can be processed by the combiner used in the system. The requested power amount is allocated to the requesting channel if the fixed value exceeds the sum. If the sum is greater than the fixed value, the request is forwarded to a timer module which later resubmits the power request after an expiration of a period of time.

In an alternate embodiment of the invention, if the requested amount of power cannot be provided, the system calculates a remaining available digital word value based on a difference between the fixed value and a sum of the digital word values from the more than one other active RF channels. The system then determines a maximum available power to the requesting one of the TDMA RF channels based on the remaining available digital word value. This maximum amount of power can be allocated immediately. A request for the full amount can be resubmitted at a later time.

An apparatus is also disclosed for controlling combiner digital overflow in a cellular communication that uses a broadband transceiver system. The apparatus receives requests for channel power and generally converts the requests into a digital word value. The digital word values of active channels in the requesting channel's time slot are added together along with the requesting channel's word value to form a sum. This sum is comparing to a fixed value. If the fixed value exceeds the sum, the requested amount of power is allocated to the requesting channel. If the power allocated to the requesting channel is less than the power requested, the request is forwarded to a timer module. After the expiration of a timer, the request is reinitiated.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
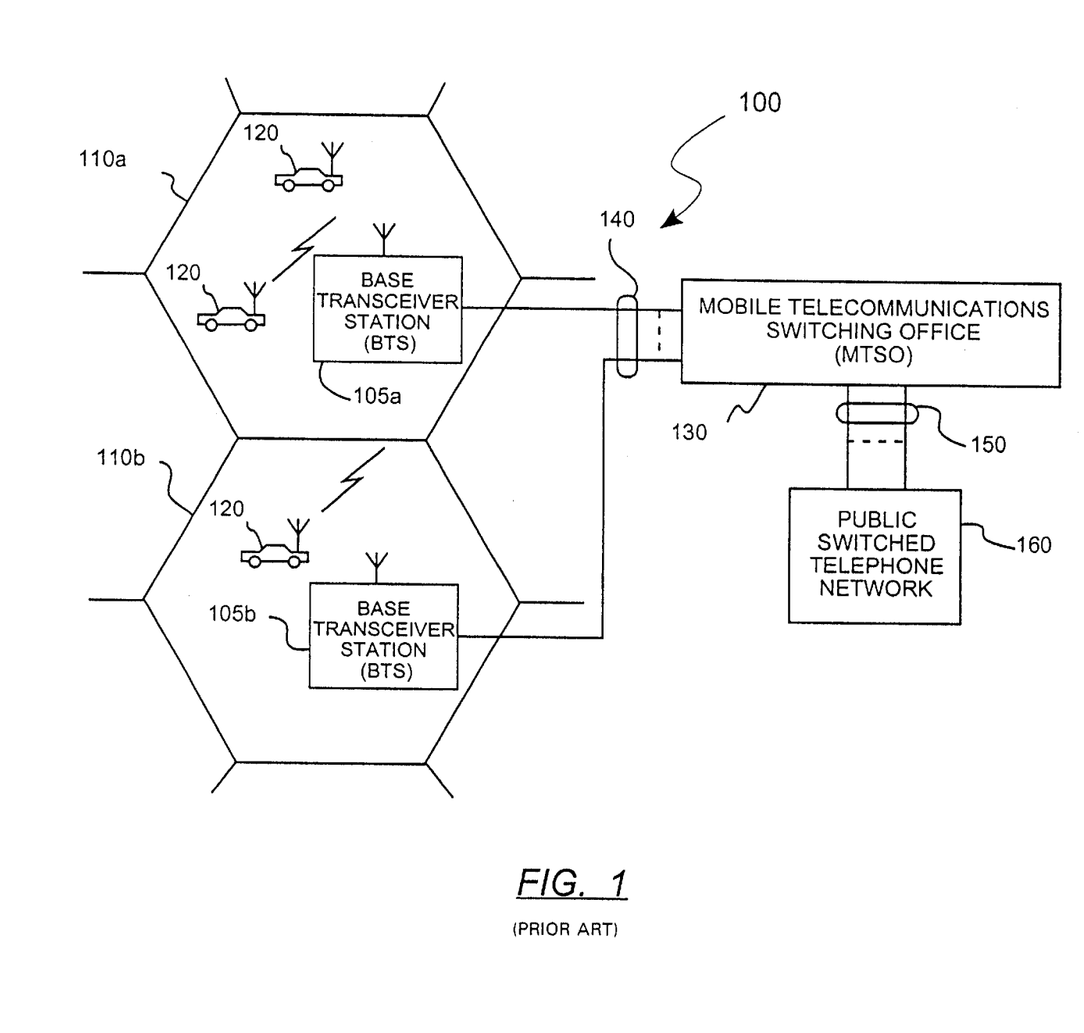
FIG. 1 illustrates a conventional cellular phone system.

FIG. 1 illustrates a conventional cellular phone system. As illustrated in FIG. 1, the cellular phone system 100 includes a plurality of cells 110a, 110b, a plurality of mobile units 120, a plurality of base transceiver stations (BTS) 105a, 105b, communication lines 140, a mobile telecommunications switching office (MTSO) 130, an interface 150 and a switched telephone network 160.

The cellular phone system 100 has a fixed number of channel sets distributed among the BTS 105a, 105b serving a plurality of cells 110a, 110b arranged in a predetermined reusable pattern. The mobile unit 120, in a cell 110a or 110b, communicates with the BTS, 105a or 105b, respectively, via radio frequency (RF) means.

The BTS 105a, 105b communicate with the MTSO 130 via communication lines 140. The MTSO 130 communicates with the switched telephone network 160 via the interface 150. In the cellular phone system 100, the cell areas typically range from 1 to 300 square miles. The larger cells typically cover rural areas, and the smaller cells typically cover urban areas. Cell antenna sites utilizing the same channel sets are spaced by a sufficient distance to assure that co-channel interference is held to an acceptably low level.

The mobile unit 120 in a cell 110a has radio telephone transceiver equipment which communicates with similar equipment in BTS 105a, 105b as the mobile unit 120 moves from cell to cell. Each BTS 105a, 105b relays telephone signals between mobile units 120 and a mobile telecommunications switching office (MTSO) 130 by way of the communication lines 140.

The communication lines 140 between a cell site, 110a or 110b, and the MTSO 130, are typically T1 lines. The T1 lines carry separate voice grade circuits for each radio channel equipped at the cell site, and data circuits for switching and other control functions.

Figure 2:
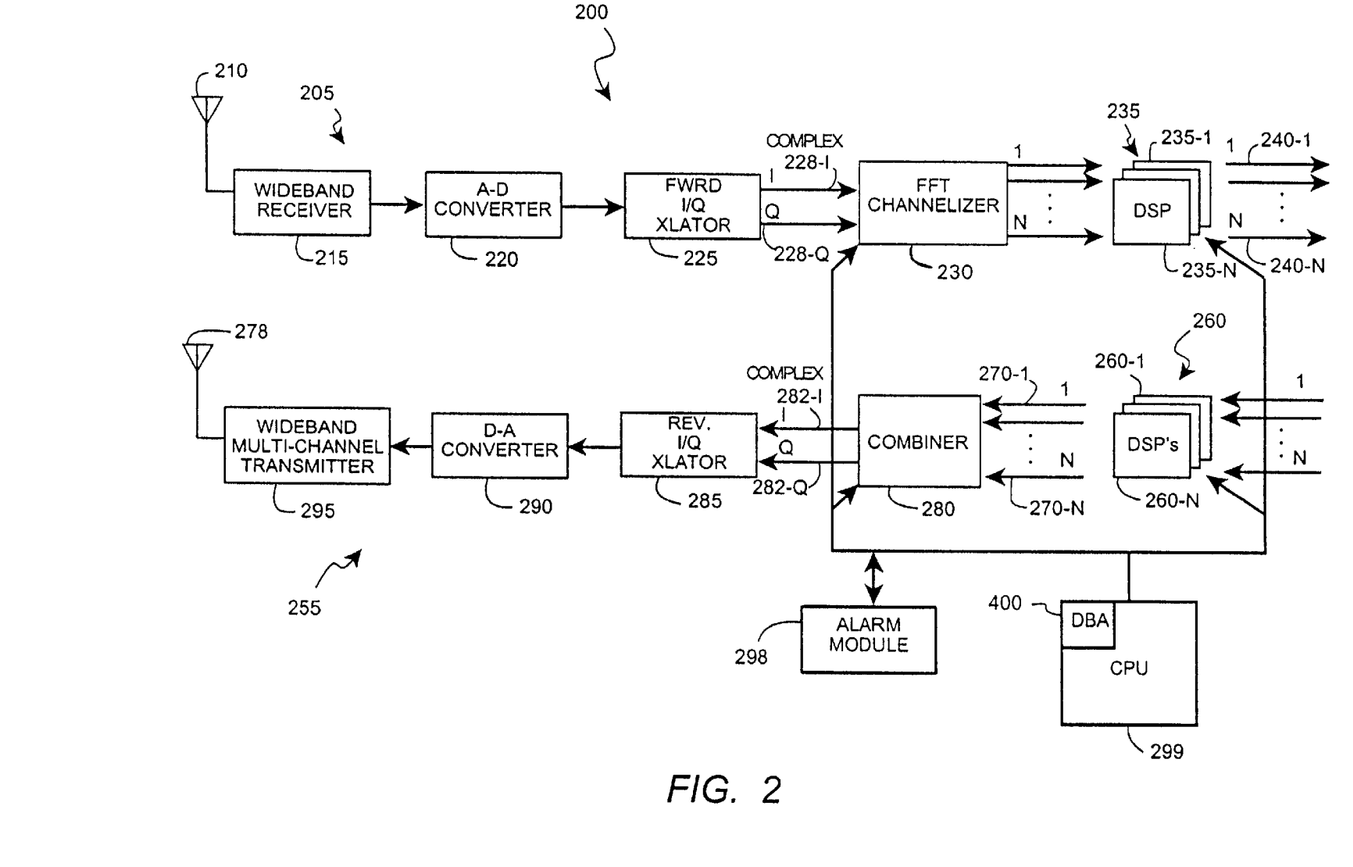
FIG. 2 illustrates an embodiment of a wideband BTS.

Referring now to FIG. 2, a broadband BTS 200 is diagrammatically illustrated as comprising a receiver section 205 and a transmitter section 255. Receiver section 205 preferably includes an antenna 210 and a wideband receiver 215 capable of receiving a plurality of carrier frequency channels offered by a communications service provider. Received signals include new power requests, power adjustment requests and traffic channel data from cellular users. The term "wideband" is not limited to any particular spectral range, and it is to be understood to imply a spectral coverage of multiple frequency channels within the communication range over which the system may operate (e.g. 12 MHz). Narrowband, on the other hand, implies a much smaller portion of the spectrum, for example, the width of an individual channel (e.g. 30 kHz).

The output of the wideband receiver 215 is down-converted into a multi-channel baseband signal which preferably contains the contents of all of the voice/data carrier frequency channels currently operative in the communication system or network of interest. This multichannel baseband signal is coupled to a high speed A-D converter 220. The dynamic range and sampling rate capabilities of the A-D converter are sufficiently high (e.g. the sampling rate may be on the order of 25 Mega-samples per second (Msps)) to enable downstream digital signal processing (DSP) components, including a Discrete Fourier Transform (DFT) channelizer 230, to process and output separate active channels.

The output of the A-D converter is coupled to a digital in-phase quadrature (I/Q) translator 225. I/Q translator 225 outputs respective I and Q channel (i.e., complex) digitally formatted signals over I and Q links 228-I and 228-Q, respectively. FFT channelizer 230 then extracts, from the composite digitized multichannel (I/Q) signal, respective narrowband carrier frequency channel signals representative of the contents of respective ones of the individual carrier frequency communication channels received by wideband receiver 215. The respective carrier frequency channel signals are coupled via N output links to respective digital signal receiver processing units 235-1 . . . 235-N, each of which demodulates and performs any associated error correction processing embedded in the modulated signal. The demodulated signals derived by digital receiver processing units 235 are coupled over respective channel links 240-1 . . . 240-N to a telephony carrier interface (e.g. T1 carrier digital interface) of an attendant telephony network (not shown).

The transmitter section 255 includes a second plurality of digital signal processing units, specifically transmitter digital signal processing units 260-1 . . . 260-N, that are coupled to receive from the telephony network respective ones of a plurality of channel digital voice/data communication signals to be transmitted over respectively different individual carrier frequency channels of the multichannel network. Transmitter digital signal processing units 260 modulate and perform pre-transmission error correction processing on respective ones of the plurality of incoming communication signals, and supply processed carrier frequency channel signals over channel links 270-1 . . . 270-N to respective input ports of an inverse FFT-based multichannel combiner unit 280, to be described below, which outputs a composite multichannel digital signal. This composite signal is representative of the contents of a wideband signal which is a composite of the respective narrowband carrier frequency channel signals output from the digital transmitter signal processing units 260. The digital output of the multichannel combiner unit 280 is coupled to an I/Q translator unit 285. I/Q translator receives respective in-phase and quadrature signal components from combiner 280 on links 282I and 282Q and provides a combined output signal to a digital-to-analog (D-A) converter 290. The output of D-A converter 290 is coupled to a wideband (multichannel) transmitter unit 295, which includes a multi-channel power amplifier (MCPA) which is not shown. The transmitter unit 295 transmits a wideband (multichannel) communication channel signal defined by the composite signal output of the inverse fast Fourier transform-based combiner unit 280. The output of transmitter unit 295 is the coupled to an antenna 298 for transmission.

A system controller 299 is provided for coordinating and controlling the operation of BTS 200. For example, the system controller 299 can include a control processing unit, memory and suitable programming for responding to transmit power control requests received from mobile units 120. System controller 299 can selectively control transmit power levels of each TDMA communication channel on a timeslot-by-timeslot basis by controlling the combiner 280. The CPU 299 may be a microprocessor, DSP processor, or micro controller software comprising the digital word banking system 400.

Figure 3:
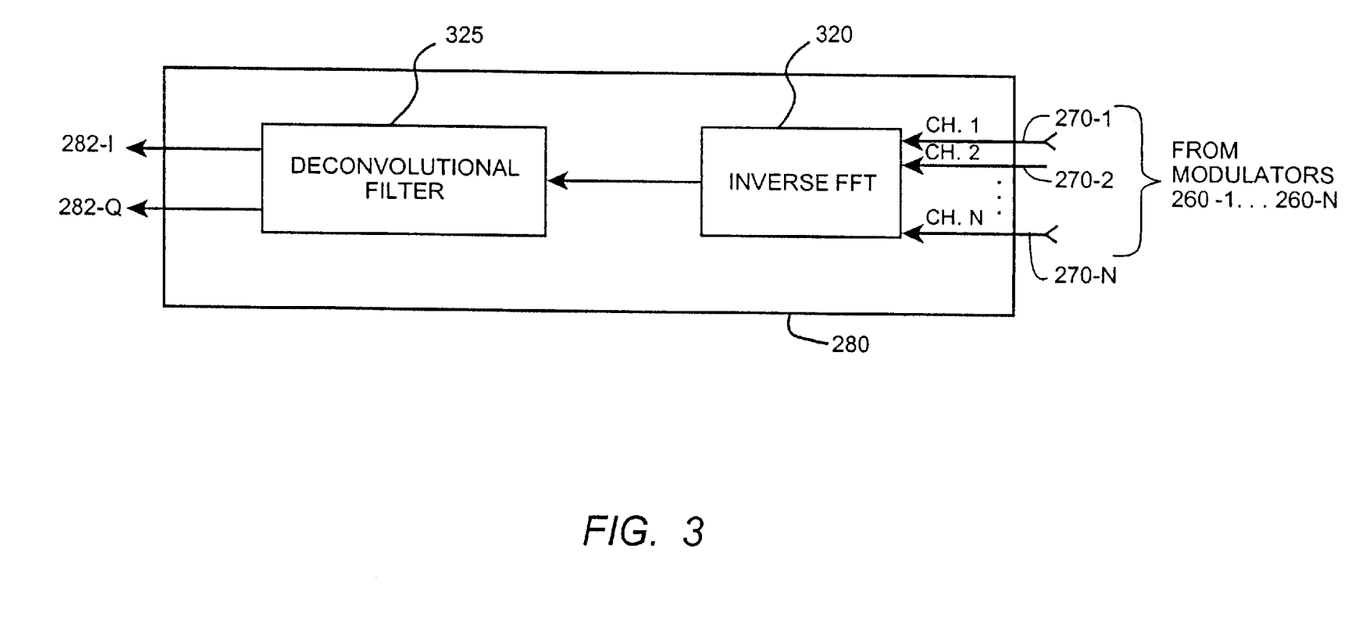
FIG. 3 illustrates an embodiment of a combiner portion of a wideband BTS.

FIG. 3 illustrates an embodiment of the combiner portion 280 of the BTS which includes an inverse FFT processor 320 and deconvolutional filter 325. The combiner 280 causes an inverse FFT to be performed. Digital signal processor units 260 1, . . . , 260-N, supply processed communication channel signals at respective output ports for input to the inverse FFT processing combiner unit 320. The FFT based-combiner is capable of receiving and processing digital words each having a predefined finite bit length. The inverse FFT-based combiner unit 320 outputs a single combined digital signal of finite bit length representative of the contents of the communication channel signals processed by the plurality of digital signal processor units 260-1, . . . , 260-N. In a preferred embodiment, the combiner 280 is a 16 bit two's complement combiner, in which each of the input channels 270 are 16 bits and the outputs 282-1 and 282-Q are also 16 bit digital words. Other combiner embodiments are available and can also be used with the invention.

A deconvolution filter 325, receives the multichannel composite digital communication signal output by the inverse FFT processor 320, and separates the signal into in-phase 282-1 and quadrature 282-Q signal components. The deconvolutional filter 325 may be embodied using an overlap and add structure or a polyphase structure. The output of the deconvolution filter 325 is coupled to a reverse I/Q translator 285, converted to an analog signal in D-A converter 290 and coupled with the transmitting unit 295. A multichannel transmitter unit 295 then, in turn, transmits a composite multiple frequency communication channel signal in accordance with the combined signal output by the discrete Fourier transform-based combiner unit 280.

Finite bit processing capability can result in digital overflow of the inverse FFT combiner 280 which is known to cause signal distortion. A software driven system for controlling digital overflow of the combiner 280 called a digital banking agent is adapted for controlling digital overflow of the combiner and is disclosed and described in FIGS. 4–8 to follow.

Figure 4:
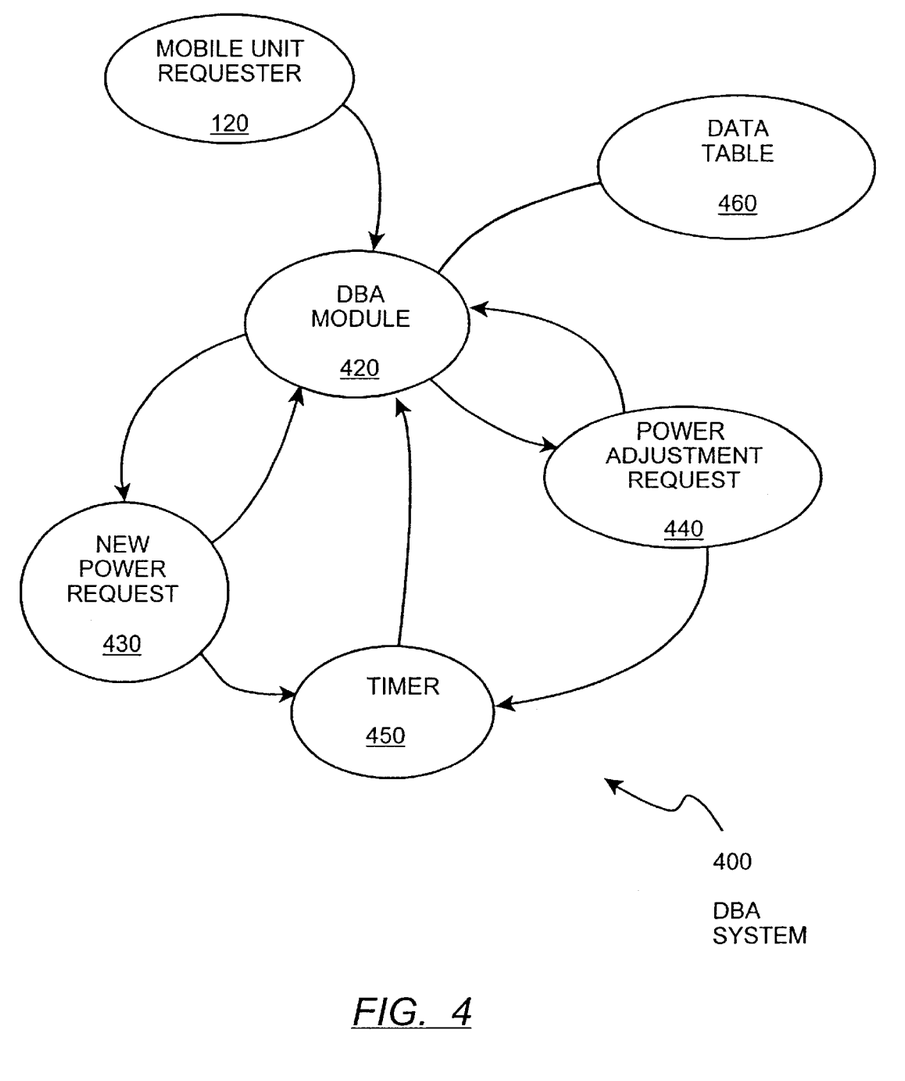
FIG. 4 illustrates an embodiment of a digital word banking agent in a generic machine application, in accordance with the principles of the present invention.

Referring to the embodiment of FIG. 4, a digital word banking system 400 is preferably provided as part of system controller 299. The system 400 preferably includes a digital word banking agent (DBA) module 420, a new power request module 430, a power adjustment request module 440, timer module 450 and data table 460.

The DBA module 420 processes incoming transmit power control requests received from mobile units 120. The DBA module 420 also maintains a matrix or database of various information such as the TDMA channel configuration (number of active channels and identity of each active logical channel) and a parameter called CVscale. CVscale is a combiner control register setting that controls the amount of left shift on the FFT output of the combiner. A given digital signal amplitude is reduced by a factor of two for each bit of left shift. The CVscale setting depends on the maximum number of carriers present and impacts each channel equivalently.

In operation, the DBA module 420 receives a request for power from a mobile unit requestor 120 as decoded by DSP 235. The DBA module 420 analyzes the request to determine what action to take next. If the request is a new power request, the DBA module 420 forwards the request to the new power request module 430. The new power request module 430 determines if the combiner has enough available digital word length to satisfy the new power request. However, if the new power request cannot be satisfied, the DBA module 420 forwards the request to the timer module 450 for re-submission at a later time. If the DBA module 420 determines that the request is for a power adjustment, the DBA module 420 forwards the power adjustment request to the power adjustment module 440. A power adjustment request may come from a channel requesting additional power or requesting a power reduction. If a power adjustment request is requesting additional power which cannot be satisfied immediately, the DBA module 420 forwards the power adjustment request to the timer module 450 for re-submission at a later time.

Figure 5:
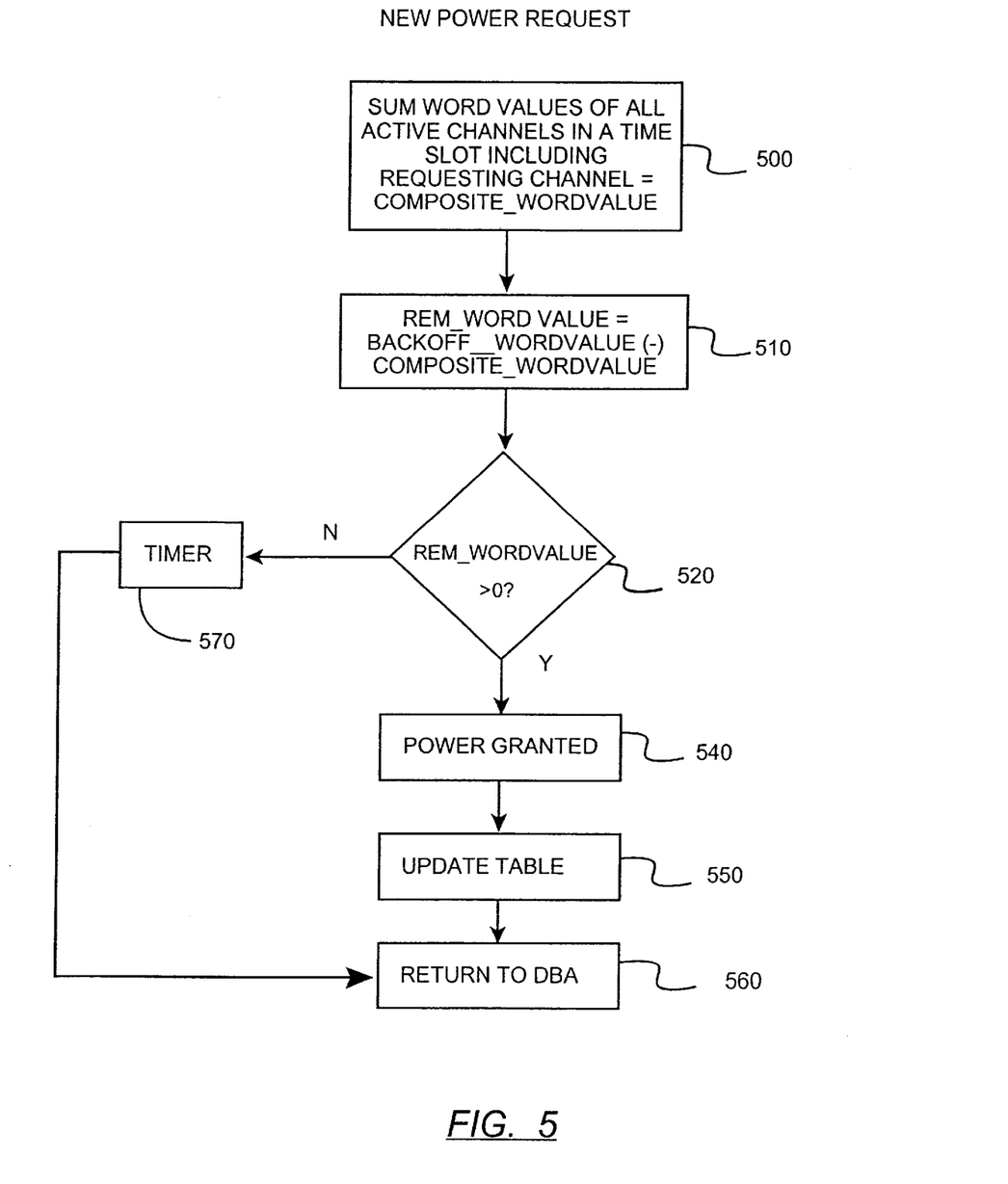
FIG. 5 illustrates a flow diagram of a new power request module of the embodiment of the digital word banking agent in FIG. 4.

FIG. 5 is a flow diagram of a process implemented by the new power request module 430. During initialization and start-up of the digital word banking system 400, the DBA module 420 creates a data table maintaining information about which logical channels are active, the allocated digital power to the each of the logical channels, their time slot assignment and the CVscale setting. Allocated digital power is the current digital representation of the power supplied to a given logical channel. The CVscale setting is the combiner control register setting that controls the amount of left shift of the FFT output of the combiner 280 and varies based on the maximum number of carriers present.

In order to ensure that the new power request can be satisfied, the new power request module 430 of the present invention determines if the combiner has the available digital word length resources to satisfy the request. For a fixed point, two's complement 16 bit combiner, the digital word length of 16 bits limits the maximum possible digital value to 32768. This represents 2 raised to the 15th power and is found if CVscale=0 and P__Val=0. Combiners can be chosen with more or less bit handling capacity and with various digital number representation schemes known in the art. Since the communication system of the present invention is preferably a TDMA system, active channels are combined on a time slot per time slot basis. Summing together the word values of the active channels in the same time slot provides a method of predicting whether combiner overflow will occur. In the above 16 bit two's complement combiner embodiment, if the channels in a given time slot sum to less than 32768, it is certain that digital overflow will not occur. The sum of the individual digital word values from the various active channels in a given TDMA time slot is referred to as Composite_Wordvalue.

For a fixed point 16 bit two's complement combiner embodiment, if the Composite_Wordvalue exceeds 32768, the combiner will eventually overflow. The overflow could be instantaneous and likely unnoticable by users. The larger the Composite_Wordvalue is relative to 32768, the more often and the more severe overflows will be. One way to characterize the amount of possible overflow is to calculate Composite_Wordvalues in 1 db steps above the full scale digital word of 32678. This quantity is called the Backoff_Threshold. As shown in Table 1, Backoff_Threshold of 0 db corresponds to 32678, while a Backoff_Threshold of 6 db corresponds to a digital word of value 32678 multiplied by 2, or approximately 65381.

TABLE 1

| dB Thresh | 0 | 1 | 2 | 3 | 4 | 5 | 6 |
|---|---|---|---|---|---|---|---|
| | 32768 | 36766 | 41252 | 46286 | 51934 | 58271 | 65381 |

| dB Thresh | 7 | 8 | 9 | 10 | 11 | 12 | 13 |
|---|---|---|---|---|---|---|---|
| | 73358 | 82309 | 92353 | 103622 | 116265 | 130452 | 146369 |

| dB Thresh | 14 | 15 | 16 | 17 | 18 | 19 | 20 |
|---|---|---|---|---|---|---|---|
| | 164229 | 184268 | 206752 | 231980 | 260285 | 292045 | 327680 |

As discussed earlier, random phasing of logical channels allows use of configurations resulting in a Composite_Wordvalue that exceeds 32768 because it is extremely unlikely all channels will be at their maximum amplitudes and in phase at the same time. At any given instant, some channel amplitudes are likely to be positive, some negative, and most off their maximum amplitudes. System administrators may use this randomness to their advantage by setting a Backoff_Threshold significantly above 32678. Thus, the word value represented by the Backoff_Threshold selected will be used by the DBA to determine whether to grant a given power request.

Thus, new power request module 430 initially calculates a Composite_Wordvalue. Composite_Wordvalue is the sum of the digital word values of all active channels in each TDMA time slot including the word value of the requesting channel. Composite_Wordvalue is determined by each channels' power level (P_Val) and the CVscale of the system. In a preferred embodiment, P_Val is a power level ranging from 0 to 15 that describes the power level of a channel relative to full scale in 2 dB increments. A P_Val of 0 corresponds to full scale power, while a P_Val of 10 represents a power level 20 db below full scale. Table 2 below demonstrates a table used by the DBA module 420 to determine a digital word value for each active channel and cumulatively for each TDMA time slot.

TABLE 2

CVscale

P_Val

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 32768 | 26029 | 20675 | 16423 | 13045 | 10362 | 8231 | 6538 | 5193 | 4125 | 3277 | 2603 | 2068 | 1642 | 1305 | 1036 |
| 1 | 16384 | 13014 | 10338 | 8211 | 6523 | 5181 | 4115 | 3269 | 2597 | 2063 | 1638 | 1301 | 1034 | 821 | 652 | 518 |
| 2 | 8192 | 6507 | 5169 | 4106 | 3261 | 2591 | 2058 | 1635 | 1298 | 1031 | 819 | 651 | 517 | 411 | 326 | 259 |
| 3 | 4096 | 3254 | 2584 | 2053 | 1631 | 1295 | 1029 | 817 | 649 | 516 | 410 | 325 | 258 | 205 | 163 | 130 |
| 4 | 2048 | 1627 | 1292 | 1026 | 815 | 648 | 514 | 409 | 325 | 258 | 205 | 163 | 129 | 103 | 82 | 65 |

FIG. 5 is a flow chart illustration operation of the new power request module 430. As shown therein, Composite_Wordvalue is computed in step 500 by summing of the digital word values of all the active channels in a given time slot plus the digital word value of the requesting channel. In step 510, the new power request module 530 determines Rem_Wordvalue by subtracting Composite_Wordvalue from the Backoff_Wordvalue. In step 520, the new power request module 430 determines if Rem_Wordvalue is greater than zero. If the Rem_Wordvalue is less than zero, the request is denied and in step 570 is forwarded to the timer module 450 of FIG. 4. The timer module 450 queues the request for re-submission after the expiration of a certain length of time. Thus, the new power request may be fulfilled at a later time when sufficient power may become available. After forwarding the signal to the timer module 450, the new power request module 430 executes step 560, returning processing to the DBA module 420.

Returning to step 520, if the new power request module 430 concludes that Rem_Wordvalue is greater than zero, then the new power request module 430 grants the quantity of power requested by the mobile unit requestor 410 to the new channel in step 540. A new entry in the data table is made for the new channel consisting of the channel number, the P_Val of that channel and its time slot assignment in step 550. The new power request module 430 then executes step 560, returning processing to the DBA module 420.

Figure 6:
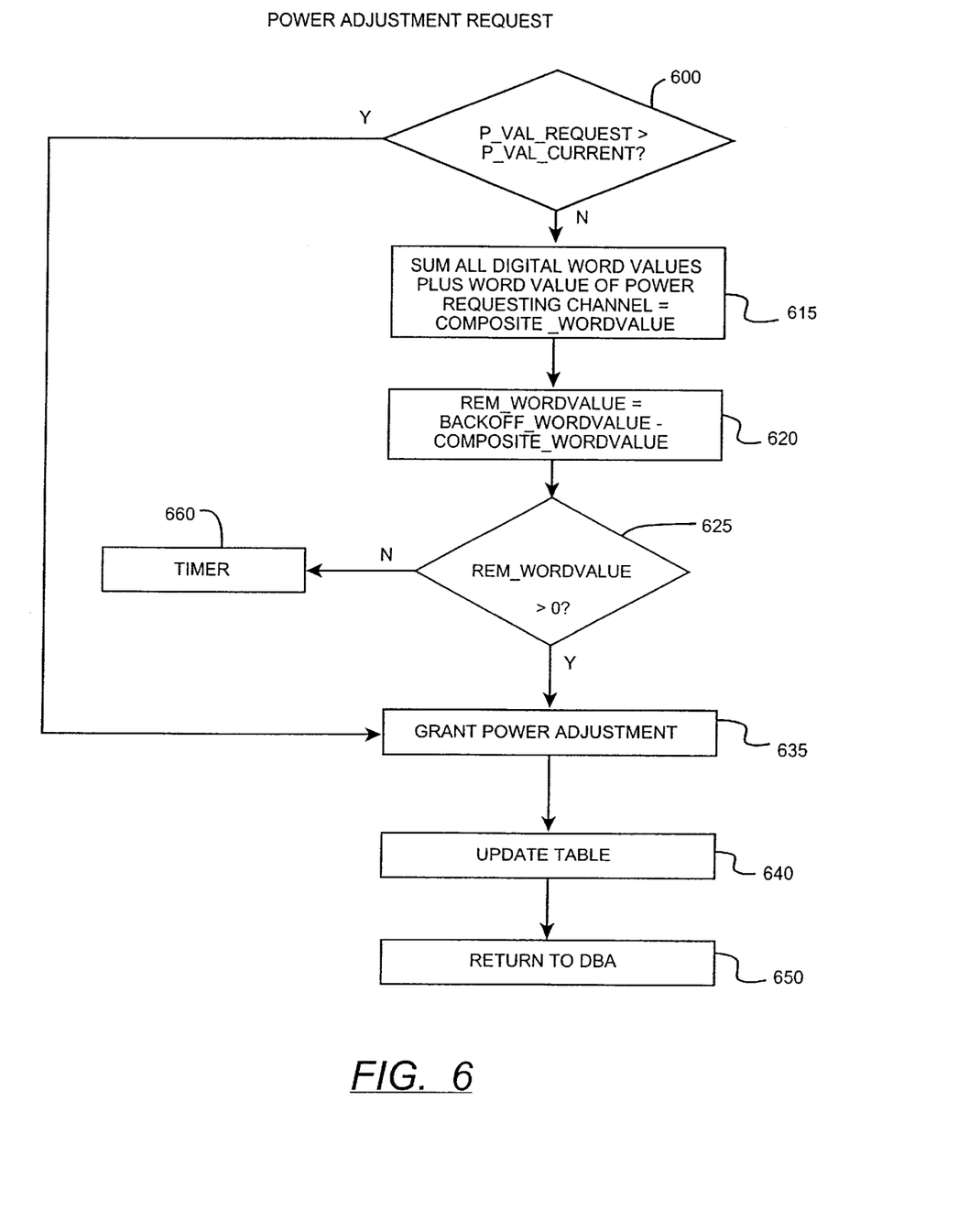
FIG. 6 illustrates a flow diagram of a power adjustment request module of the embodiment of the digital word banking agent in FIG. 4.

FIG. 6 is a flow diagram of a process implemented by the power adjustment request module 440 associated with the system of FIG. 4 according to the principles of the present invention. A mobile unit 120 operating on a particular channel will request a power adjustment in two situations. In the first circumstance, the channel requires additional power, and in the second circumstance the channel has too much power. A request for additional power may occur when a mobile user moves further away from its serving BTS 105a, 105b. To identify each of the two distinct situations, the power adjustment request module compares the power requested, designated P_Val_Request, to the requesting channel's current power consumption, P_Val_Current in step 600.

Recalling that P-Val represents an amount of power reduction relative to full scale, then if the value of P_Val_Request is greater than P_Val_Current, the mobile unit request is for a power reduction. In that case, the power adjustment request is automatically granted in step 635 and the DBA module 420 in step 640 updates the data table 460 of logical channels, their associated time slot and power consumption by the channel requesting adjustment. The value of P_Val_Current for the particular channel is also overwritten by the value of P_Val_Request in step 640. After updating the data table 460 in step 640, the power adjustment module executes step 650, returning processing to the DBA module 420.

Returning to step 600, if the quantity P_Val_Request is less than P_Val_Current, the channel is requesting more power than it is consuming at the time of the request. In order to ensure that there is sufficient digital word value available to supply the requested power, it is necessary to determine the digital word value available in the requesting channel's time slot given the other active channels digital word value use in that same time slot. Thus, in step 615, Composite_Wordvalue is calculated by summing the digital word values allocated for each of the active logical channels plus the requested digital word value of the requesting channel. In step 620, Rem_Wordvalue is calculated by subtracting the quantity Composite_Wordvalue from Backoff_Wordvalue. As described with respect to step 510, Backoff_Wordvalue is a fixed quantity representing the maximum composite digital word value allowed in the combiner. In step 625, the quantity Rem_Wordvalue is compared to zero. If the Rem_Wordvalue is less than zero, the requested power adjustment is denied and is forwarded in step 660 to the timer module 450.

Returning to step 625, if Rem_Wordvalue greater than zero, the power adjustment request module 440 grants the power adjustment in step 635. In step 640, the matrix or table that tracks each active channel and its corresponding power consumption and time slot is updated. The specific channel that requested the additional power is indexed and the corresponding current power consumption entry P_Val_Current is overwritten by the requested power quantity, P_Val_Request. Finally, in step 650, the power adjustment module 440 returns processing to the DBA module 420.

Figure 7:
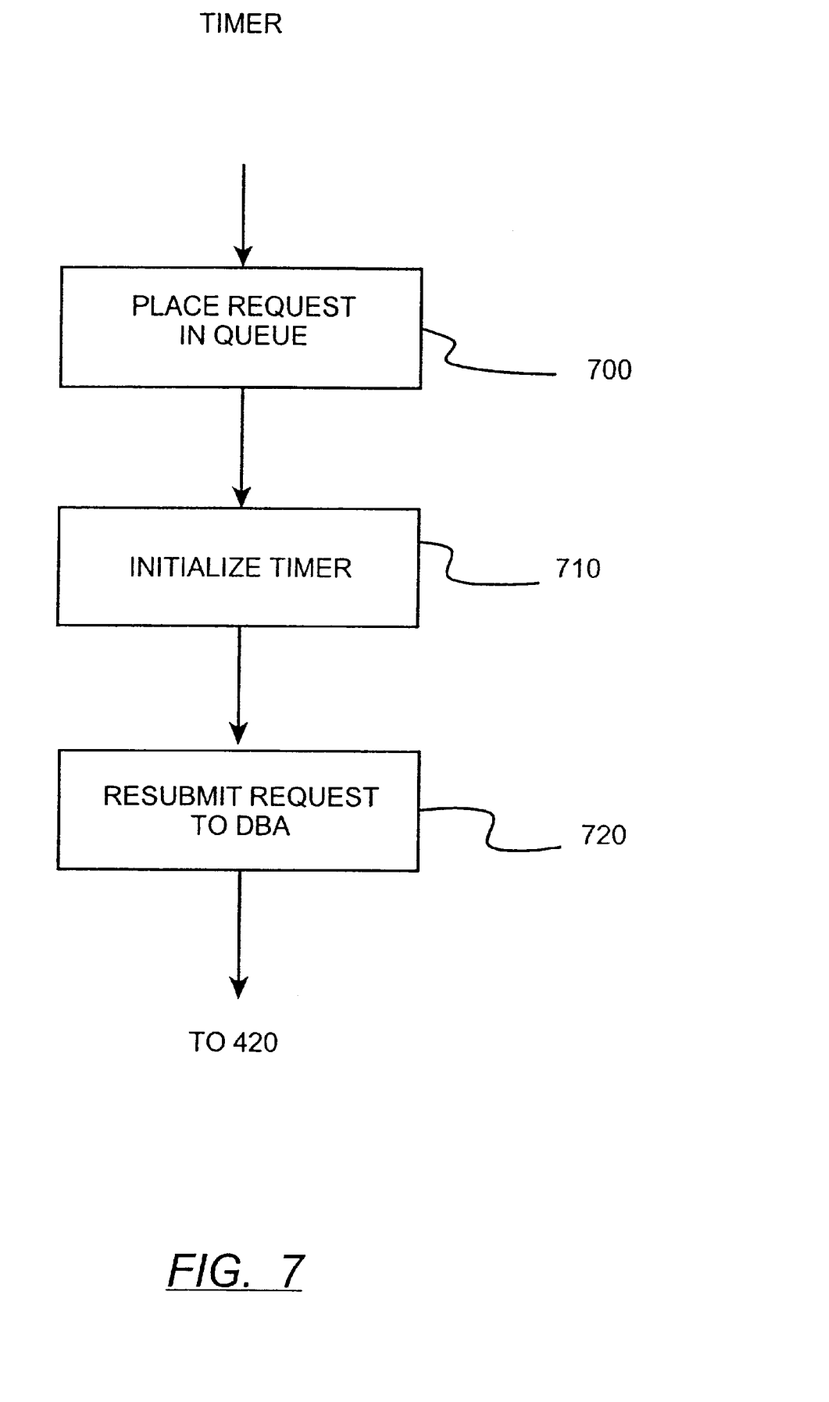
FIG. 7 illustrates a flow diagram of a timer module of the embodiment of the digital word banking agent in FIG. 4.

FIG. 7 illustrates a flow diagram for an embodiment for the timer module 450 of the digital word banking system 400 of FIG. 4 according to the principles of the present invention. When a given power request is denied as in step 520 or 625, it can be resubmitted subsequently, and if conditions permit upon resubmission, the request can be satisfied at a later time. This permits the recovery of power from idle or partially-powered logical channels.

If a request for a new channel is denied in step 520 or power adjustment request for additional power is denied in step 625, the denied power request is placed in a queue in step 700 for later re-submission. In step 710, a timer is initialized and the power request is queued for re-submission at the expiration of the timer interval. In step 720, when the timer interval expires, the request is forwarded again to the DBA module 420 for processing.

Figure 8:
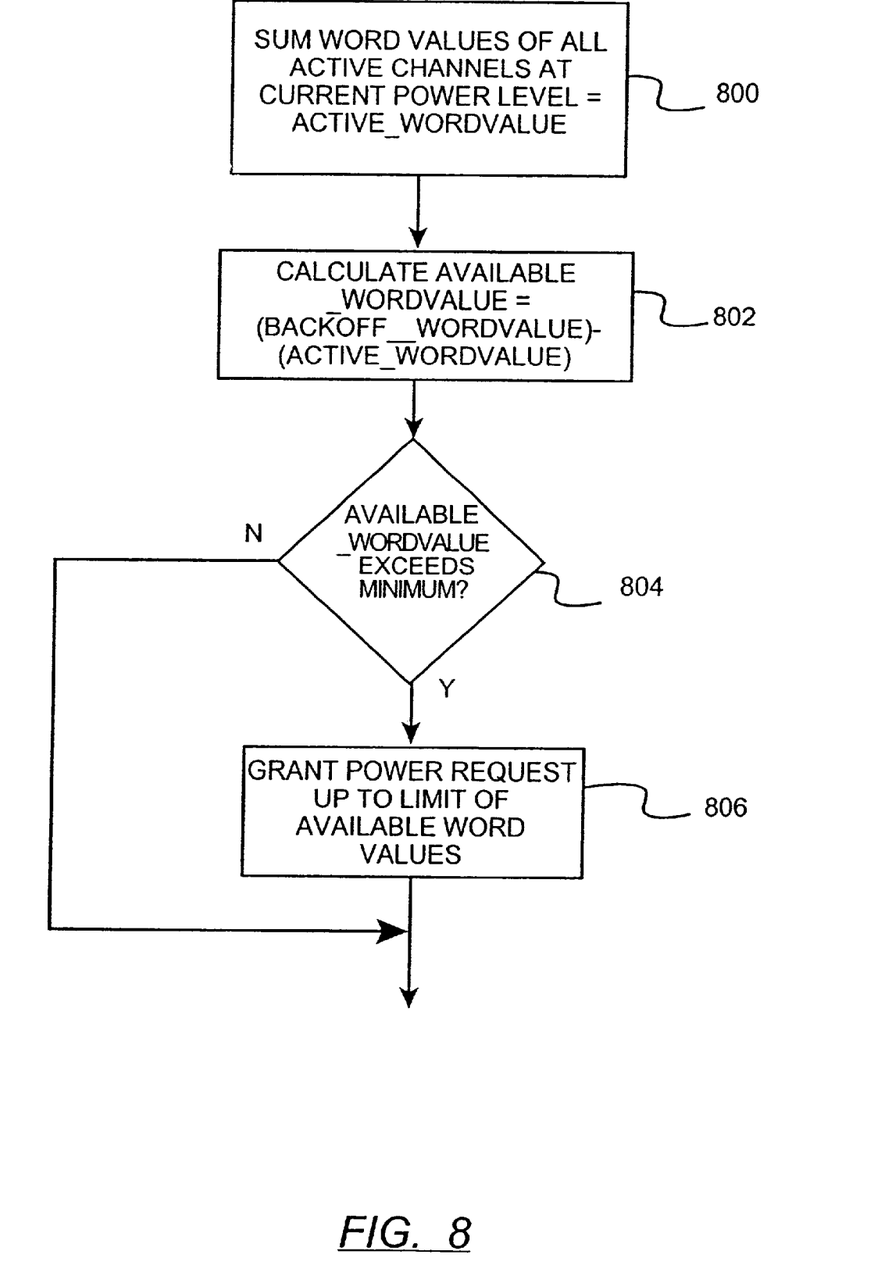
FIG. 8 illustrates a flow diagram of an optional process for partially fulfilling power requests.

FIG. 8 is a flowchart which illustrates an alternative process of the invention which may be used for those instances when it is determined in step 520 or 625 that there is insufficient remaining word value (Rem_Wordvalue) to permit a new power request or power adjustment request to be granted. In that case the process in FIG. 8 will permit the system to determine whether a lesser power request can be granted which will partially satisfy the request. Thus, prior to proceeding to step 570 in FIG. 5 or 660 in FIG. 6, the system would transition to the process illustrated in the flowchart of FIG. 8.

In step 800 of FIG. 8, the system calculates a value for Active_Wordvalue which is equal to the sum of the word values for all active channels at current power levels. In step 802, the system proceeds to calculate Available_Wordvalue by subtracting from the Backoff_Wordvalue the calculated value for the Active_Wordvalue. This Available_Wordvalue represents the maximum value word value which is permissible without exceeding the Backoff_Wordvalue.

In step 804, the system can optionally determine whether the Available_Wordvalue exceeds a predetermined minimum value. This optional step is performed to avoid granting trivial amounts of additional requested power in response to power adjustment requests or unusable small amounts of power in the case of a new power request. If the Available_Wordvalue exceeds the pre-determined minimum in step 804, then in step 806 the system preferably grants the power request up to the maximum value as limited by the available word length. Finally, the system will return to the process in FIG. 5 or 6 by forwarding the power request to the timer 450 in step 570 or 660, respectively. This will permit any partially satisfied request for power to be resubmitted to the DBA module 420 at a later time as previously described.

The system illustrated in FIG. 8 is advantageous in that it attempts to satisfy mobile unit power requests to the best ability of the system. Thus, if the new power or power adjustment request cannot be granted at the requested level, then the system will at least respond by granting the request at a maximum available power level.

While the invention has been described with reference to the exemplary embodiments thereof, those skilled in the art will be able to make various modifications to the described embodiments of the invention without departing from the true spirit and scope of the invention.

What is claimed is:

1. In a cellular communication system having mobile subscribers and a broadband transceiver system that uses a combiner to digitally combine the signals of more than one TDMA RF channel into a single composite multichannel digital output signal during each of a plurality of TDMA time slots, a method for controlling digital overflow of said combiner comprising:

receiving a request from one of said more than one TDMA RF channels, wherein said request includes a requested power value;

converting said requested power to a requested digital word value;

calculating a digital word value to represent a power level for each of said more than one active TDMA RF channels in said requesting channel's time slot;

adding together said digital word values from said more than one other active RF channels and said requested digital word value into a sum for said requesting channel's time slot;

comparing said sum to a fixed value; and determining allocation of an amount of power to said requesting channel based on said comparing.

2. The method according to claim 1, wherein said requested power amount is allocated to said requesting channel if said fixed value exceeds said sum.

3. The method according to claim 1, wherein said requesting channel is not allocated any power if said sum exceeds said fixed value.

4. The method according to claim 1, further comprising comparing said allocated power to said requested power; and forwarding said request to a timer module if said comparing of said allocated power to said requested power determines that said requested power is greater than said allocated power.

5. The method according to claim 4, further comprising returning said request from said timer module after an expiration of a timer, if said request is forwarded to said timer module.

6. The method according to claim 1, further comprising:

calculating a remaining available digital word value based on a difference between said fixed value and a sum of said digital word values from said more than one other active RF channels;

determining a maximum available power to said requesting one of said TDMA RF channels based on said remaining available digital word value.

7. In a cellular communication system having mobile subscribers and a broadband transceiver system that uses a combiner to digitally combine the signals of more than one TDMA RF channel into a single composite multichannel digital output signal during each of a plurality of TDMA time slots, an apparatus for controlling digital overflow of said combiner comprising:

means for receiving a request from one of said more than one TDMA RF channels, wherein said request includes a requested power value;

means for converting said requested power to a requested digital word value;

means for calculating a digital word value to represent a power level for each of said more than one other active TDMA RF channels in said requesting channel's time slot;

means for adding together the resulting said digital word values from said more than one other active RF channels into a sum for said requesting channel's time slot;

means for comparing said sum to a fixed value; and means for allocation of an amount of power to said requesting channel based on said comparing.

8. The apparatus for controlling digital overflow of said combiner of claim 7 further comprising:

means for comparing said allocated power to said requested power; and means for forwarding said request to a timer module if said comparing of said allocated power to said requested power determines that said requested power is greater than said allocated power.

9. The apparatus for controlling digital overflow of said combiner of claim 8 further comprising, a means for returning said request from said timer after an expiration of a timer, if said request is forwarded to said timer module.

10. The apparatus for controlling digital overflow of said combiner of claim 7, further comprising, means for calculating a remaining available digital word value based on a difference between said fixed value and a sum of said digital word values from said more than one other active RF channels;

means for determining a maximum available power for said requesting one of said TDMA RF channels based on said remaining available digital word value.

11. In a cellular communication system having mobile subscribers and a broadband transceiver system that uses a combiner to digitally combine the signals of more than one TDMA RF channel into a single composite multichannel digital output signal during each of a plurality of TDMA time slots, a method for controlling digital overflow of a combiner comprising:

receiving a request from one of said more than one TDMA RF channels, wherein said request includes a requested power value;

comparing said requested power value with a current power value for said channel; and recording said requested power value for said requesting channel as said current power value if it is determined that said requested power is less than or equal to said current power value.

* * * * *